United States Patent
Kawaguchi et al.

(10) Patent No.: US 11,977,642 B2
(45) Date of Patent: May 7, 2024

(54) INFORMATION PROCESSING DEVICE, INFORMATION PROCESSING METHOD AND COMPUTER READABLE MEDIUM

(71) Applicant: Mitsubishi Electric Corporation, Tokyo (JP)

(72) Inventors: Mami Kawaguchi, Tokyo (JP); Daisuke Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 441 days.

(21) Appl. No.: 17/227,975

(22) Filed: Apr. 12, 2021

(65) Prior Publication Data

US 2021/0232692 A1    Jul. 29, 2021

Related U.S. Application Data

(63) Continuation of application No. PCT/JP2018/044349, filed on Dec. 3, 2018.

(51) Int. Cl.
  *G06F 21/57*       (2013.01)
(52) U.S. Cl.
  CPC ...... *G06F 21/577* (2013.01); *G06F 2221/034* (2013.01)
(58) Field of Classification Search
  None
  See application file for complete search history.

(56) References Cited

U.S. PATENT DOCUMENTS

| 6,134,580 A | 10/2000 | Tahara et al. |
| 2001/0023486 A1 | 9/2001 | Kayashima et al. |

(Continued)

FOREIGN PATENT DOCUMENTS

| DE | 69732943 T2 | 5/2006 |
| DE | 60129942 T2 | 4/2008 |

(Continued)

OTHER PUBLICATIONS

German Office Action for German Application No. 112018008112.5, dated Apr. 7, 2022, with English translation.

(Continued)

*Primary Examiner* — Fatoumata Traore
(74) *Attorney, Agent, or Firm* — Birch, Stewart, Kolasch & Birch, LLP

(57) ABSTRACT

An evaluation item generation unit (107) acquires a plurality of candidates for security evaluation items to be adopted to a plurality of apparatuses included in an information system. Further, the evaluation item generation unit (107) analyzes at least one of: whether or not each apparatus of the plurality of apparatuses has a communication path with an outside communication apparatus being an apparatus which is in the information system and performs communication with the outside of the information system; and whether or not there exists in each apparatus of the plurality of apparatuses, a security evaluation item an adoption of which is to be exempted due to an adoption of which to another apparatus in the information system, and selects for each apparatus of the plurality of apparatuses, a security evaluation item to be adopted, from the plurality of candidates for the security evaluation items based on an analysis result.

9 Claims, 14 Drawing Sheets

(56) References Cited

U.S. PATENT DOCUMENTS

| | | | |
|---|---|---|---|
| 2001/0025346 A1 | 9/2001 | Kayashima et al. | |
| 2003/0014518 A1 | 1/2003 | Richard | |
| 2008/0184368 A1* | 7/2008 | Coon | H04L 63/1416 |
| | | | 726/23 |
| 2008/0276302 A1* | 11/2008 | Touboul | G06F 21/85 |
| | | | 726/3 |
| 2009/0024663 A1* | 1/2009 | McGovern | G06F 21/577 |
| 2010/0115601 A1* | 5/2010 | Brandstetter | G06F 21/577 |
| | | | 726/25 |
| 2010/0175106 A1* | 7/2010 | Diebler | H04L 67/125 |
| | | | 726/1 |
| 2013/0218496 A1 | 8/2013 | Nie et al. | |
| 2013/0269029 A1* | 10/2013 | Nakawatase | H04L 63/16 |
| | | | 726/22 |

FOREIGN PATENT DOCUMENTS

| | | |
|---|---|---|
| JP | 2001-273388 A | 10/2001 |
| JP | 2014-504388 A | 2/2014 |
| JP | 2014-106920 A | 6/2014 |
| JP | 2016-143299 A | 8/2016 |

OTHER PUBLICATIONS

International Search Report issued in PCT/JP2018/044349 (PCT/ISA/210), dated Feb. 12, 2019.

\* cited by examiner

Fig. 8

| EVALUATION ITEM NUMBER | EVALUATION ITEM NAME | |
|---|---|---|
| SUBJECT APPARATUS NAME | ESSENTIAL ITEM FLAG | |
| OPTION FLAG | OPTION CONDITION | |
| EVALUATION METHOD | SCAN-NECESSARY FLAG | |
| SCAN SUBJECT | | |
| CHECK ITEM | | |
| EVALUATION STANDARD VALUE | | |
| CORRESPONDING THREAT EXAMPLE | | |
| MEASURE EXAMPLE | | |

106

INFORMATION PROCESSING DEVICE, INFORMATION PROCESSING METHOD AND COMPUTER READABLE MEDIUM

CROSS REFERENCE TO RELATED APPLICATIONS

This application is a Continuation of PCT International Application No. PCT/JP2018/044349, filed on Dec. 3, 2018, of which is hereby expressly incorporated by reference into the present application.

TECHNICAL FIELD

The present invention relates to a security evaluation of an information system.

BACKGROUND ART

Patent Literature 1 discloses that a management audit program is executed on an apparatus which is included in an information system and is subject to a security evaluation. Then, the management audit program acquires information such as a version of software installed in the apparatus. Further, an inspection apparatus which is different from the apparatus subject to the security evaluation performs the security evaluation of the apparatus based on the information that the management audit program has acquired.

Patent Literature 2 discloses a technique in which a client apparatus transmits a set security level to a server. Then, the server evaluates a security measure of the client apparatus by returning a determination result of the security level to the client apparatus.

CITATION LIST

Patent Literature

Patent Literature 1: JP2001-273388A
Patent Literature 2: JP2014-106920A

SUMMARY OF INVENTION

Technical Problem

In the techniques of Patent Literature 1 and Patent Literature 2, a same security evaluation item is adopted to all apparatuses subject to the security evaluation. However, since characteristics are different in each of the apparatuses, it is desirable to select for each of the apparatuses, an appropriate security evaluation item according to the characteristics.

For example, possibilities of being attacked from the outside are largely different between an apparatus that has a possibility of communicating with the outside of an information system and an apparatus that has no possibility of communicating with the outside of an information system.

Further, there exists a security evaluation item an adoption of which to another apparatus (hereinafter, referred to as an apparatus B) may be exempted, when it is adopted to a certain apparatus (hereinafter, referred to as an apparatus A) in an information system. In such a case, if the security evaluation item is adopted to the apparatus A and the apparatus B, an unnecessary process occurs for the apparatus B.

In the techniques of Patent Literature 1 and Patent Literature 2, since the same security evaluation item is adopted to all the apparatuses, there is a problem that the appropriate security evaluation item is not selected according to the characteristics of the apparatus.

One of the main aims of the present invention is to solve such a problem. More specifically, the present invention mainly aims to enable selection of an appropriate security evaluation item according to characteristics of an apparatus.

Solution to Problem

An information processing device according to the present invention includes:
a candidate acquisition unit to acquire a plurality of candidates for security evaluation items to be adopted to a plurality of apparatuses included in an information system; and
an item selection unit to analyze at least one of: whether or not each apparatus of the plurality of apparatuses has a communication path with an outside communication apparatus being an apparatus which is in the information system and performs communication with the outside of the information system; and whether or not there exists in each apparatus of the plurality of apparatuses, a security evaluation item an adoption of which is to be exempted due to an adoption of which to another apparatus in the information system, and select for each apparatus of the plurality of apparatuses, a security evaluation item to be adopted, from the plurality of candidates for the security evaluation items based on an analysis result.

Advantageous Effects of Invention

In the present invention, a security evaluation item is selected for each apparatus in consideration of at least one of a possibility of communicating with the outside of an information system and a possibility in which there is the security evaluation item an adoption of which is to be exempted due to an adoption of which to another apparatus in the information system. Therefore, according to the present invention, it is possible to select an appropriate security evaluation item according to characteristics of the apparatus.

BRIEF DESCRIPTION OF DRAWINGS

FIG. 8 is a diagram illustrating an example of a security evaluation item according to the first embodiment.

DESCRIPTION OF EMBODIMENTS

Figure 1:
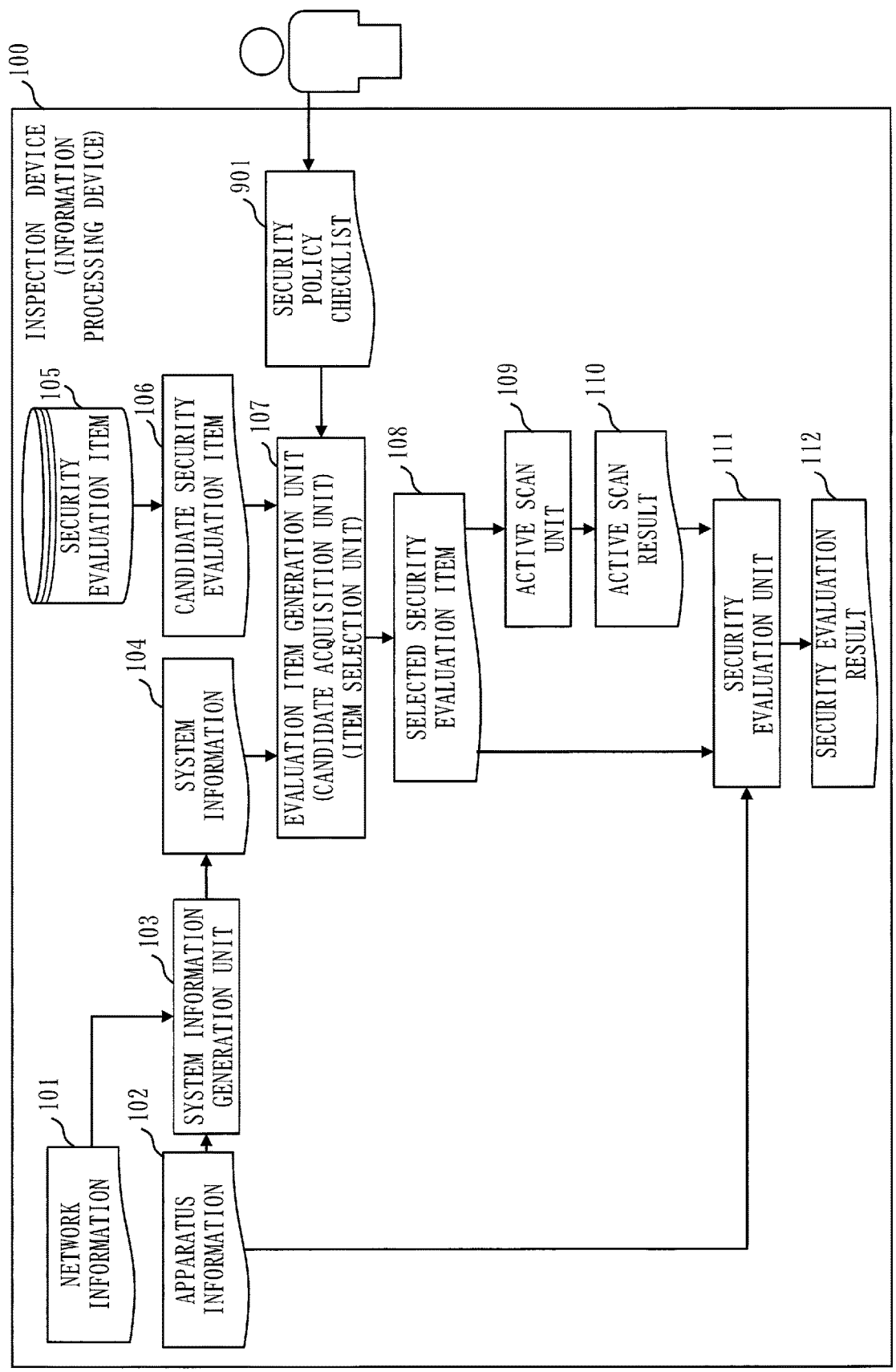
FIG. 1 is a diagram illustrating a functional configuration example of an inspection device according to a first embodiment.

Hereinafter, embodiments of the present invention will be described with reference to the drawings. In the following description of the embodiments and the drawings, the same reference numerals indicate the same or corresponding parts.

First Embodiment

*Description of Configuration*

In the present embodiment, a configuration will be described in which security evaluation items to be adopted to a plurality of apparatuses included in an information system are selected. Hereinafter, the security evaluation item is also simply referred to as an evaluation item.

In the present embodiment, descriptions are given taking a control system as an example of the information system. In the control system, a PLC (Programmable Logic Controller), an HMI (Human Machine Interface), a field apparatus, and the like are connected via Ethernet (registered trademark) or a control network.

Hereinafter, the PLC, the HMI, the field apparatus, and the like included in the control system are collectively referred to as an apparatus or an evaluation subject apparatus.

FIG. 1 illustrates a functional configuration example of an inspection device 100 according to the present embodiment.

Figure 2:
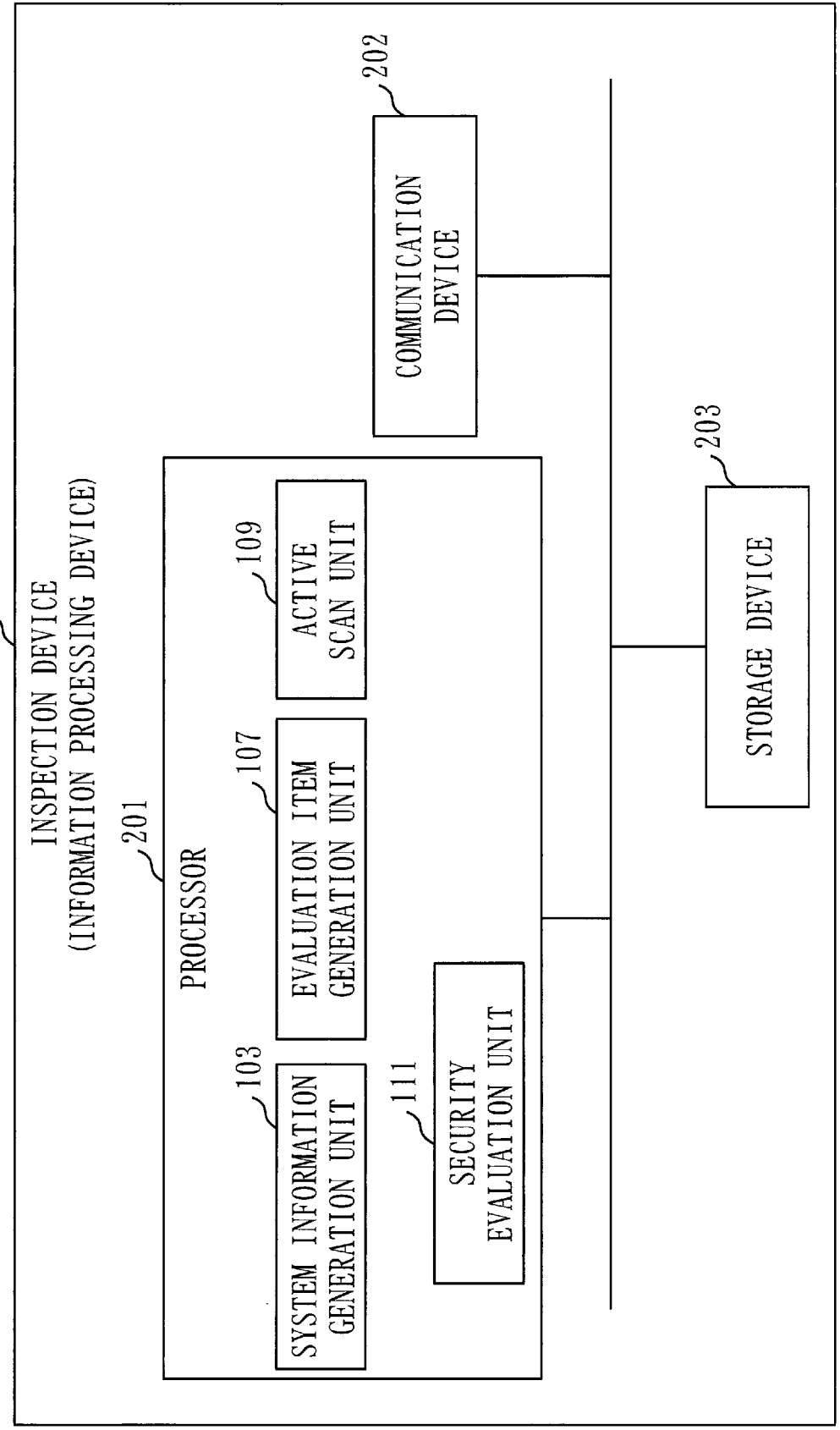
FIG. 2 is a diagram illustrating a hardware configuration example of the inspection device according to the first embodiment.

Further, FIG. 2 illustrates a hardware configuration example of the inspection device 100.

The inspection device 100 selects the security evaluation item for each apparatus of the plurality of apparatuses included in the control system.

The inspection device 100 may be any apparatus that configures the control system or may be an apparatus that is not included in the control system.

The inspection device 100 is an example of an information processing device. Further, operation performed by the inspection device 100 are examples of an information processing method and an information processing program.

As illustrated in FIG. 1, the inspection device 100 is configured by a system information generation unit 103, an evaluation item generation unit 107, an active scan unit 109, and a security evaluation unit 111.

Hereinafter, descriptions for each will be given.

The system information generation unit 103 acquires network information 101 and apparatus information 102 and generates system information 104. Then, the system information generation unit 103 outputs the generated system information 104 to the evaluation item generation unit 107 and the security evaluation unit 111.

The network information 101 indicates a network configuration and a connection relationship in the control system. The apparatus information 102 indicates a state, a function, a communication address, and the like of each of the apparatuses included in the control system.

Figure 6:
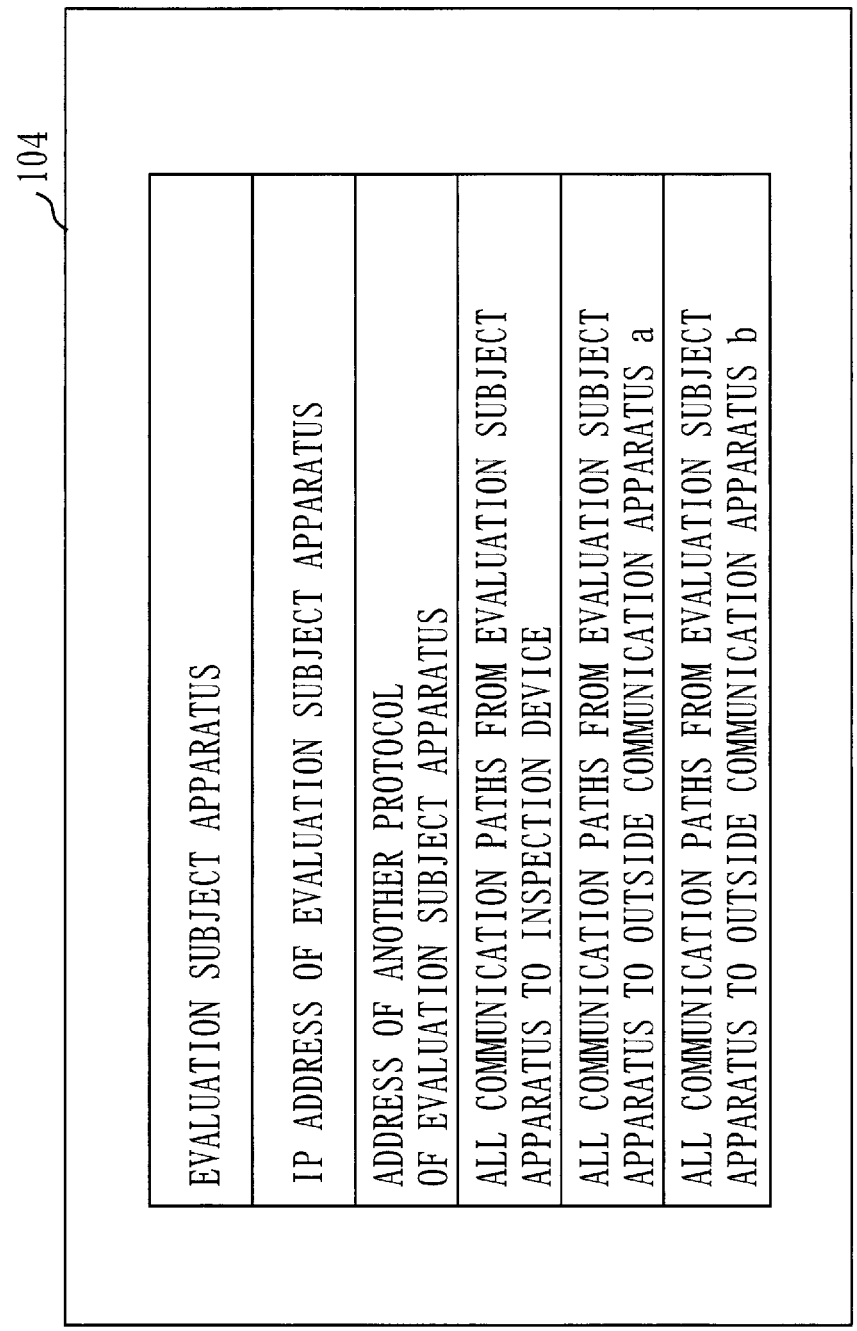
FIG. 6 is a diagram illustrating an example of system information according to the first embodiment.

In the system information 104, a communication path from the apparatus to the inspection device 100, a communication path from the apparatus to an outside communication apparatus, and the like are indicated for each of the apparatuses. The outside communication apparatus is an apparatus which is in the control system and performs communication with the outside of the control system. FIG. 6 illustrates an example of the system information 104. Details of the system information 104 will be described later.

The evaluation item generation unit 107 acquires the system information 104, a candidate security evaluation item 106, and a security policy checklist 901. Then, the evaluation item generation unit 107 generates a selected security evaluation item 108 based on the system information 104, the candidate security evaluation item 106, and the security policy checklist 901. Then, the evaluation item generation unit 107 outputs the selected security evaluation item 108 to the active scan unit 109 and the security evaluation unit 111.

The selected security evaluation item 108 is a security evaluation item selected for each of the apparatuses.

The candidate security evaluation item 106 is a candidate for the security evaluation item extracted from security evaluation items 105. FIG. 8 illustrates an example of the candidate security evaluation item 106. Details of the candidate security evaluation item 106 will be described later. The evaluation item generation unit 107 acquires a plurality of candidate security evaluation items 106 for the plurality of apparatuses.

The security evaluation items 105 are all the security evaluation items that can be adopted to the control system. The candidate security evaluation item 106 is a candidate for the security evaluation item which is selected from the security evaluation items 105 according to characteristics of the control system and is likely to be adopted to the apparatus included in the control system. An extraction of the candidate security evaluation item 106 from the security evaluation items 105 may be manually performed by a user of the inspection device 100 or may be performed by an element in the inspection device 100, which is not illustrated in FIG. 1, other than the system information generation unit 103, the evaluation item generation unit 107, the active scan unit 109, and the security evaluation unit 111. The security evaluation items 105 exist, for example, in a database outside of the inspection device 100. The security evaluation items 105 may exist, for example, on the Internet.

Figure 9:
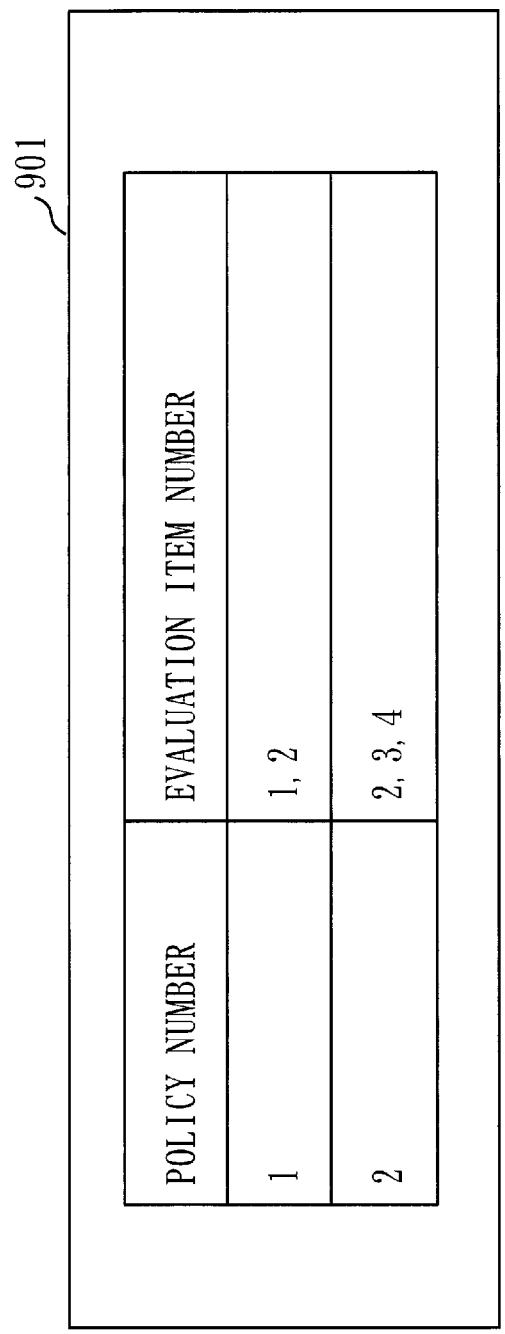
FIG. 9 is a diagram illustrating an example of a security policy checklist according to the first embodiment.

The security policy checklist 901 indicates a selection standard for selecting the selected security evaluation item 108 from the plurality of candidate security evaluation items 106. The security policy checklist 901 is generated, for example, by the user of the inspection device 100. FIG. 9 illustrates an example of the security policy checklist 901. Details of the security policy checklist 901 will be described later.

The evaluation item generation unit 107 acquires as the candidate security evaluation items 106, the candidates for the security evaluation items to be adopted to the plurality of apparatuses included in the control system. The evaluation item generation unit 107 corresponds to a candidate acquisition unit.

Further, the evaluation item generation unit 107 selects for each of the apparatuses, the security evaluation item to be adopted. The evaluation item generation unit 107 corresponds to an item selection unit. More specifically, the evaluation item generation unit 107 analyzes at least one of:

whether or not each of the apparatuses has a communication path with the outside communication apparatus; and whether or not there exists for each of the apparatuses, the security evaluation item the adoption of which is to be exempted due to the adoption of which to another apparatus in the control system. Further, based on an analysis result, the evaluation item generation unit 107 selects for each of apparatuses, a security evaluation item to be adopted, from the candidates for the security evaluation items.

Note that, operation performed by the evaluation item generation unit 107 corresponds to a candidate acquisition process and an item selection process.

The active scan unit 109 acquires the selected security evaluation items 108 and performs an active scan on each of the apparatuses using the selected security evaluation items 108. Then, the active scan unit 109 outputs to the security evaluation unit 111, a result of the active scan as an active scan result 110.

The security evaluation unit 111 acquires the system information 104, the selected security evaluation items 108, and the active scan results 110, evaluates a security setting status of each of the apparatuses, and outputs evaluation results as security evaluation results 112.

Next, a hardware configuration of the inspection device 100 will be described with reference to FIG. 2.

\*\*\*Description of Configuration\*\*\*

The inspection device 100 according to the present embodiment is a computer.

The inspection device 100 includes a processor 201, a communication device 202, and a storage device 203 as hardware.

The storage device 203 stores programs that realize functions of the system information generation unit 103, the evaluation item generation unit 107, the active scan unit 109, and the security evaluation unit 111 which are illustrated in FIG. 1.

The processor 201 executes these programs to perform operation of the system information generation unit 103, the evaluation item generation unit 107, the active scan unit 109, and the security evaluation unit 111.

FIG. 2 schematically illustrates a state in which the processor 201 executes the programs that realize the functions of the system information generation unit 103, the evaluation item generation unit 107, the active scan unit 109, and the security evaluation unit 111.

The communication device 202 is used when the network information 101, the apparatus information 102, and the security evaluation items 105 which are illustrated in FIG. 1 are received from the outside apparatus. Further, the communication device 202 is also used when the active scan unit 109 executes the active scan. Further, the communication device 202 is used when the security evaluation result 112 is transmitted to the outside apparatus. Therefore, the communication device 202 has an interface supporting Ethernet (registered trademark), a control-purpose network protocol, and the like. The communication device 202 includes one or a plurality of such interfaces as necessary.

\*\*\*Description of Operation\*\*\*

Next, an operation example of the inspection device 100 will be described with reference to FIG. 3.

Figure 3:
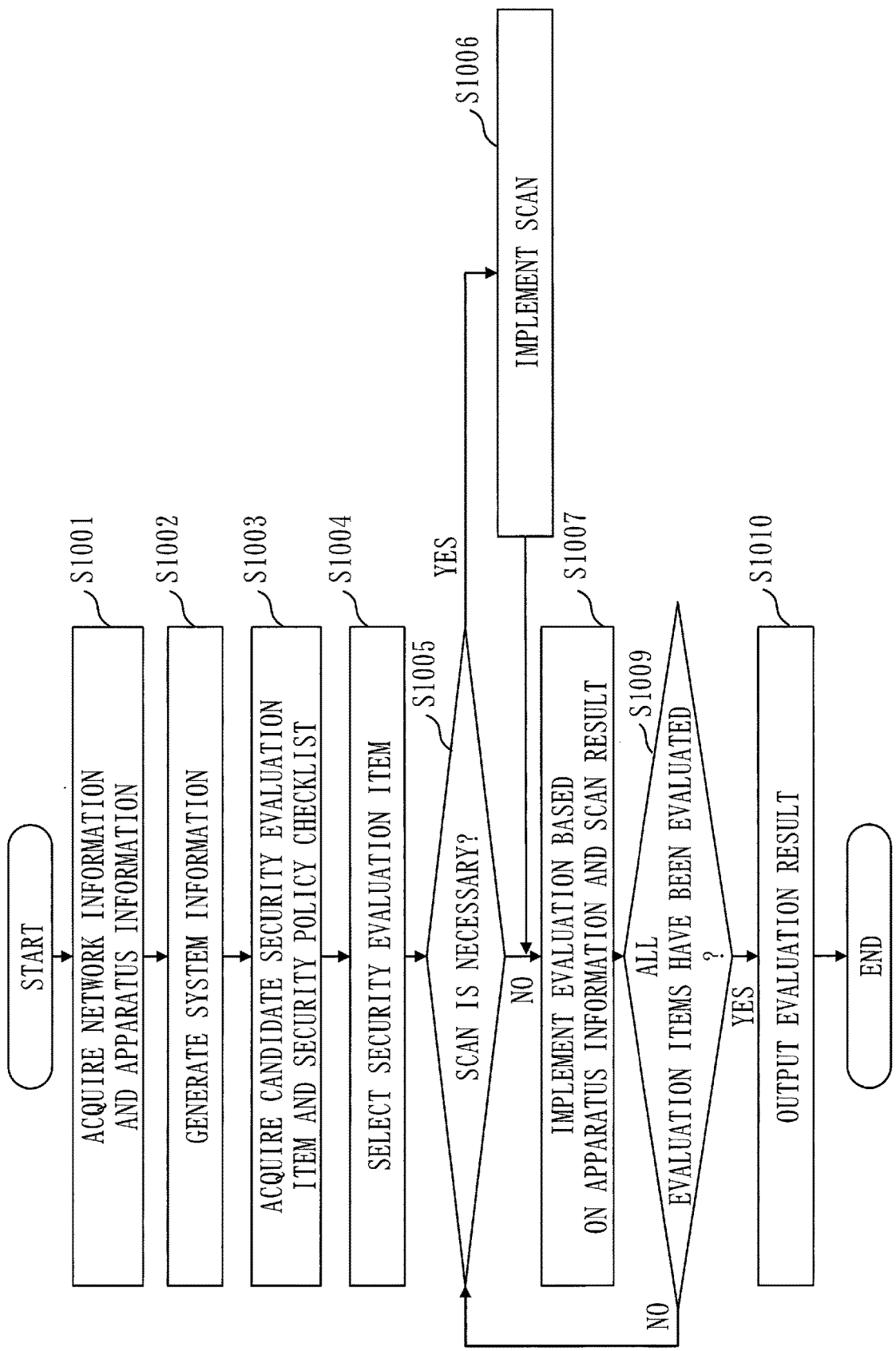
FIG. 3 is a flowchart illustrating an operation example of the inspection device according to the first embodiment.

FIG. 3 illustrates an example of operation of the inspection device 100. An operation flow of the inspection device 100 does not necessarily have to be as in FIG. 3.

When there is a request for the security evaluation from the user of the inspection device 100, the system information generation unit 103 acquires the network information 101 and the apparatus information 102 in step S1001.

Next, in step S1002, the system information generation unit 103 generates the system information 104 by using the network information 101 and the apparatus information 102.

Besides, details of a generation process of the system information 104 in step S1002 will be described later.

Next, in step S1003, the evaluation item generation unit 107 acquires the candidate security evaluation item 106 and the security policy checklist 901. Further, the evaluation item generation unit 107 also acquires the system information 104.

Next, in step S1004, the evaluation item generation unit 107 selects for each of the apparatuses, the security evaluation item based on the system information 104, the candidate security evaluation item 106, and the security policy checklist 901. Then, the evaluation item generation unit 107 outputs to the active scan unit 109 and the security evaluation unit 111, the selected security evaluation item 108 which indicates a selection result.

Details of a selection process of the security evaluation item in step S1004 will be described later.

In step S1005, the active scan unit 109 checks for each of the apparatuses, whether the active scan is necessary or not for the selected security evaluation item 108.

If the active scan is necessary (YES in step S1005), the process proceeds to step S1006. On the other hand, when the active scan is unnecessary (NO in step S1005), the process proceeds to step S1007.

In step S1006, the active scan unit 109 executes the active scan in order to acquire the information on an evaluation subject, which is necessary for an evaluation method described in a corresponding security evaluation item.

Besides, details of an execution process of the active scan in step S1006 will be described later.

In step S1007, the security evaluation unit 111 evaluates the security setting status of each of the apparatuses using the apparatus information 102, the selected security evaluation item 108, and the active scan result 110.

Besides, details of the security evaluation process in step S1007 will be described later.

When the evaluations are completed for all the security evaluation items of the selected security evaluation items 108 (YES in step S1009), the security evaluation unit 111 outputs the security evaluation result 112 in step S1010. The security evaluation unit 111 outputs the security evaluation result 112 to, for example, a display device connected to the inspection device 100. Further, the security evaluation unit 111 may transmit the security evaluation result 112 to the outside apparatus by using the communication device 202.

On the other hand, if there is a security evaluation item for which the evaluation has not been completed (NO in step S1009), the process returns to step S1005. The processes from step S1005 to step S1009 are repeated until the evaluations for all the security evaluation items are completed.

Next, with reference to FIG. 4, the details of the generation process of the system information 104 in step S1002 of FIG. 3 will be described.

Figure 4:
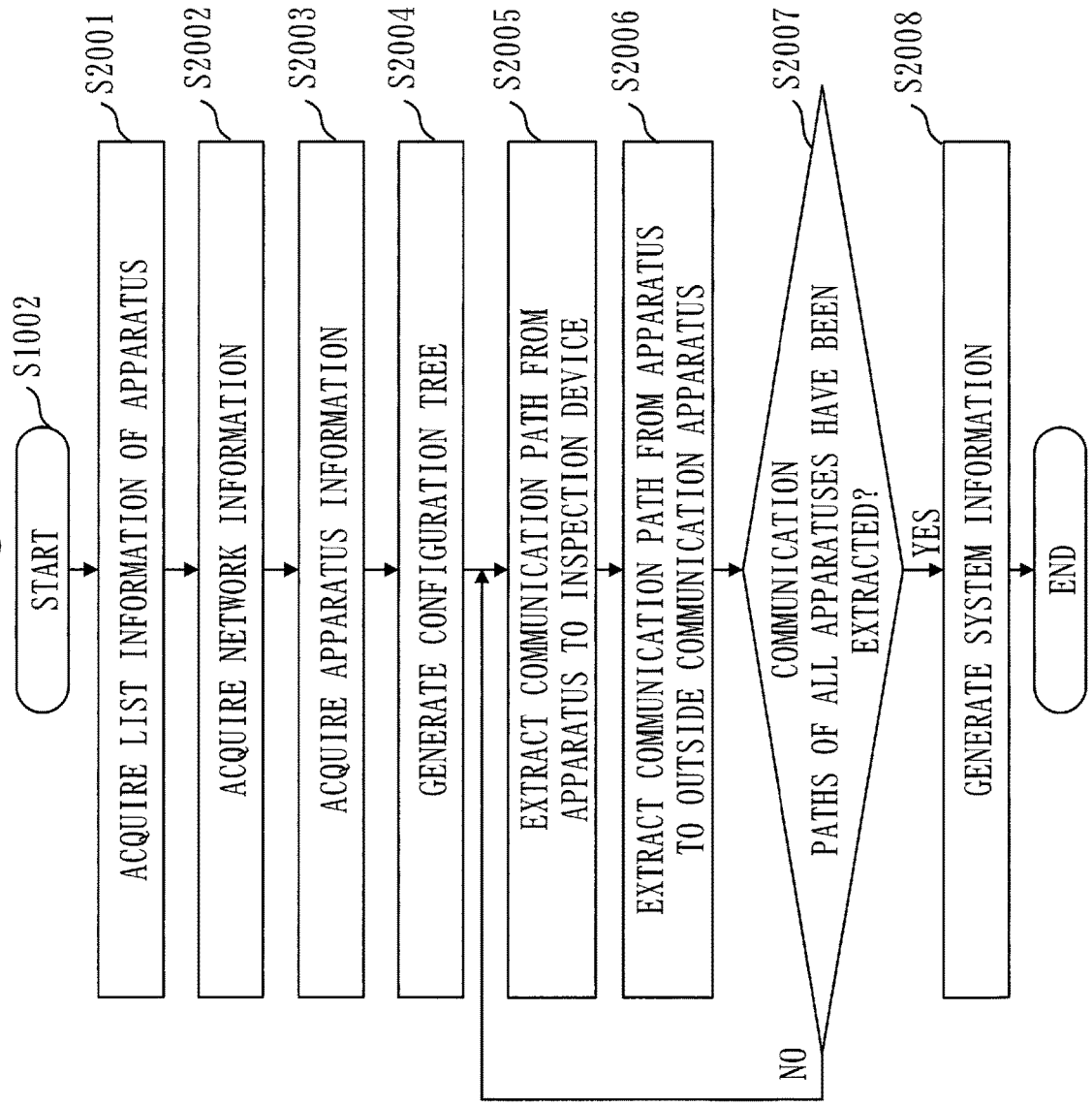
FIG. 4 is a flowchart illustrating an operation example of the inspection device according to the first embodiment.

Besides, a procedure for generating the system information 104 does not necessarily have to be as in FIG. 4.

First, in step S2001, the system information generation unit 103 acquires list information of the apparatuses configuring the control system.

Next, in step S2002, the system information generation unit 103 acquires the network information 101. The network information 101 indicates a connection relationship between each of the apparatuses, which are indicated in the list information of the apparatuses acquired in step S2001, and a network, and a connection relationship between the apparatuses.

Next, in step S2003, the system information generation unit 103 acquires the apparatus information 102.

The apparatus information 102 indicates a function, a status, a communication address, and the like of each of the apparatuses which are indicated in the list information of the apparatuses acquired in step S2001.

Next, in step S2004, the system information generation unit 103 combines pieces of information acquired in steps S2001 to S2003 to generate a configuration tree from the inspection device 100.

At this time, the system information generation unit 103 generates the configuration tree in such a way that an apparatus that performs the communication with the outside of the control system, that is, the outside communication apparatus can be distinguished from other apparatuses. For example, the system information generation unit 103 generates the configuration tree, while setting a flag on the outside communication apparatus.

Figure 5:
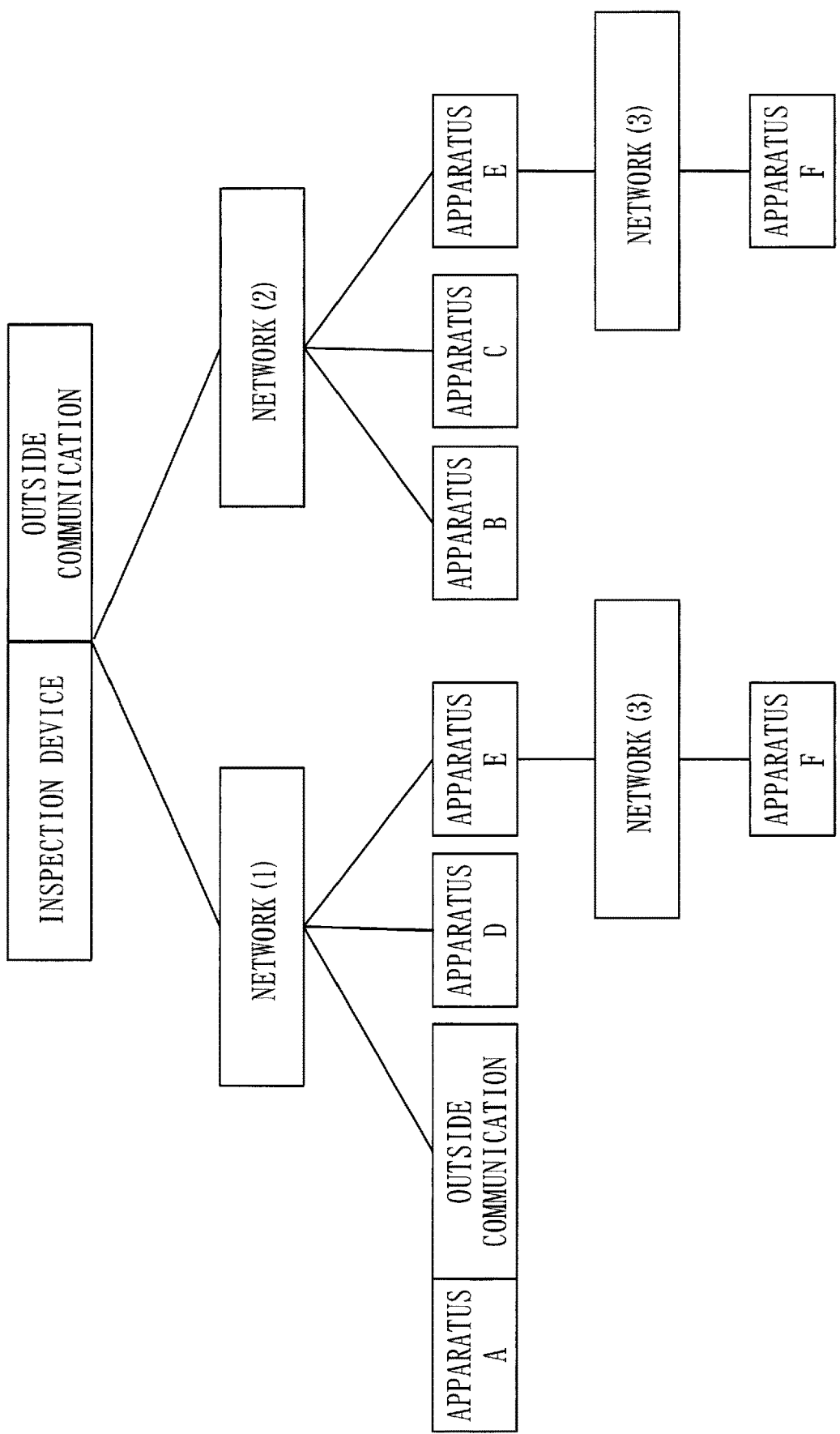
FIG. 5 is a diagram illustrating an example of a configuration tree according to the first embodiment.

An example of the configuration tree generated in step S2004 is illustrated in FIG. 5.

In the example illustrated in FIG. 5, the inspection device 100 is included in the control system. The configuration tree illustrated in FIG. 5 indicates the inspection device 100, the apparatuses included in the control system, the networks between the inspection device 100 and the apparatuses, and the networks between the apparatuses. In addition, a flag as "outside communication" is set on an apparatus (the outside communication apparatus) capable of communicating with the outside of the control system.

Next, in step S2005, the system information generation unit 103 extracts the communication path from each of the apparatuses to the inspection device 100.

More specifically, the system information generation unit 103 analyzes the configuration tree generated in step S2004 and extracts the communication path from each of the apparatuses to the inspection device 100. When there are a plurality of communication paths from the apparatuses to the inspection device 100, the system information generation unit 103 extracts all the communication paths. For example, when same apparatuses are at a plurality of locations in the configuration tree, the system information generation unit 103 determines that the plurality of communication paths exist, and extracts all the communication paths. In the example of FIG. 5, since each of the apparatus E and the apparatus F exists at two locations, the system information generation unit 103 extracts two communication paths for the apparatus E and also extracts two communication paths for the apparatus F.

Next, in step S2006, the system information generation unit 103 extracts the communication path from each of the apparatuses to the outside communication apparatus.

More specifically, the system information generation unit 103 extracts the outside communication apparatus in the configuration tree generated in step S2004, and extracts the communication path from each of the apparatuses to the extracted outside communication apparatus.

The system information generation unit 103 also extracts the communication path from the apparatus to the outside communication apparatus via the inspection device 100. In this case, a communication path is extracted which is configured by a communication path from the apparatus to the inspection device 100 and a communication path from the inspection device 100 to the outside communication apparatus.

Further, also in step S2006, if the same apparatuses are at a plurality of locations in the configuration tree, the system information generation unit 103 determines that a plurality of communication paths exist, and extracts all the communication paths. In the example of FIG. 5, since each of the apparatus E and the apparatus F exists at two locations, the system information generation unit 103 extracts two communication paths for the apparatus E and also extracts two communication paths for the apparatus F.

When the extraction of the communication path in step S2005 and the extraction of the communication path in step S2006 are completed for all the apparatuses indicated in the list information of the apparatuses acquired in step S2001 (YES in step S2007), the process proceeds to step S2008.

On the other hand, when there exists an apparatus for which the extraction of the communication path has not been completed (NO in step S2007), the processes from step S2005 to step S2007 are repeated until the extraction of the communication path is completed for all the apparatuses.

In step S2008, the system information generation unit 103 generates the system information 104 for each of the apparatuses.

FIG. 6 illustrates an example of the system information 104.

The system information 104 described in FIG. 6 includes pieces of information such as an IP address of the evaluation subject apparatus, all the communication paths from the evaluation subject apparatus to the inspection device 100, and all the communication paths from the evaluation subject apparatus to the outside communication apparatus.

Figure 7:
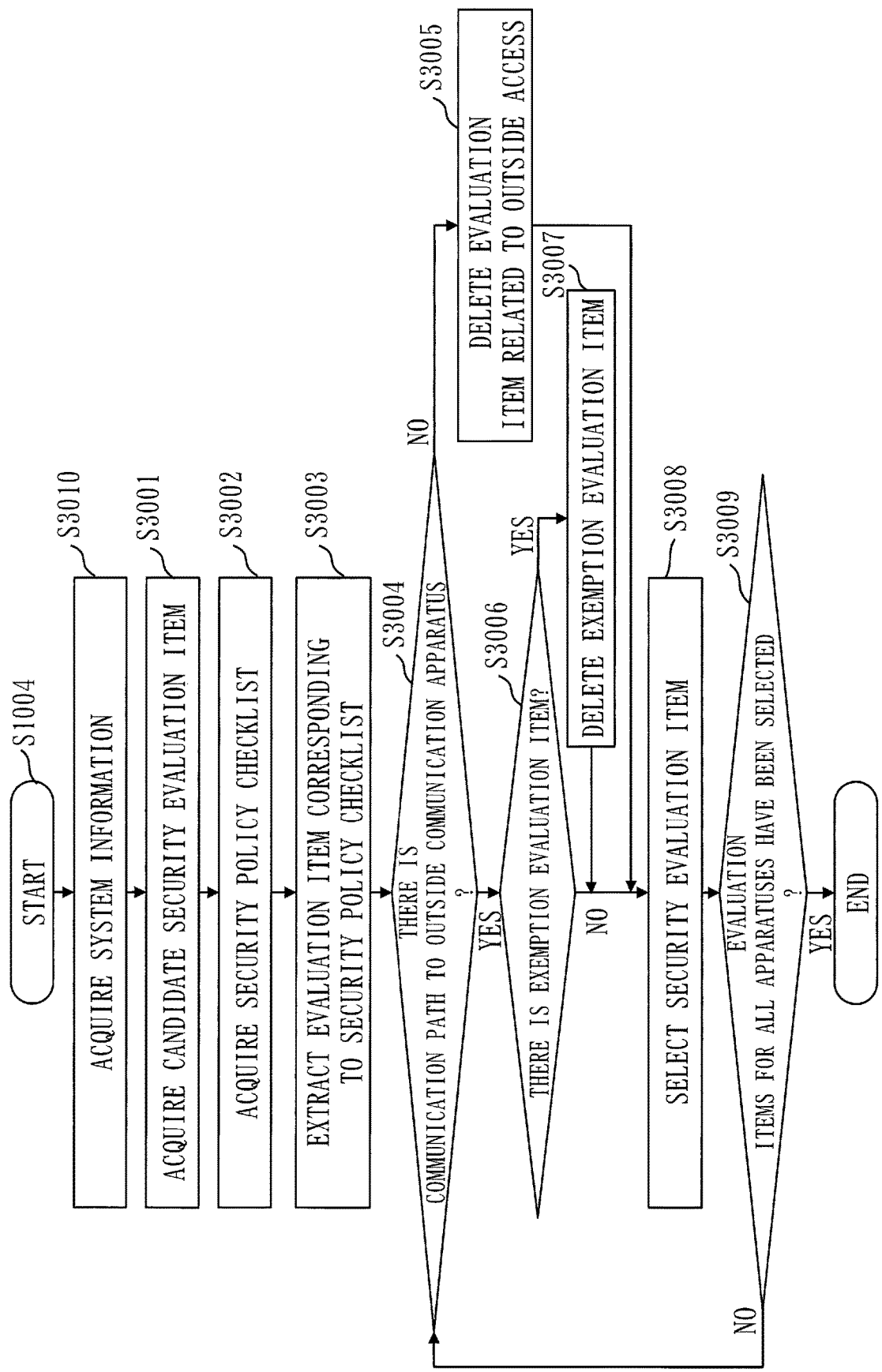
FIG. 7 is a flowchart illustrating an operation example of the inspection device according to the first embodiment.

Next, the details of the selection process of the security evaluation item in step S1004 illustrated in FIG. 3 will be described with reference to FIG. 7.

In step S3010, the evaluation item generation unit 107 acquires the system information 104.

Next, in step S3001, the evaluation item generation unit 107 acquires the candidate security evaluation item 106.

FIG. 8 illustrates an example of the candidate security evaluation item 106.

The candidate security evaluation item 106 of FIG. 8 includes an evaluation item number, an evaluation item name, a subject apparatus name, an essential item flag, an option flag, an option condition, an evaluation method, a scan-necessary flag, a scan subject, a check item, an evaluation standard value, and a corresponding-threat example and a measure example.

The evaluation item number is used for association with security policy.

The essential item flag indicates whether or not it is essential for the subject apparatus to satisfy this evaluation item. If the essential item flag is on, it is essential for the subject apparatus to satisfy this evaluation item.

The option flag indicates presence or absence of the option condition. If the option flag is on, the option condition is present.

The option condition indicates a determination condition as to whether or not to select this evaluation item for the subject apparatus. For example, an outside access condition is described in the option condition. The outside access condition is a condition that this evaluation item is selected for the subject apparatus only when there exists the communication path from the subject apparatus to the outside communication apparatus. Further, the option condition describes, for example, an adoption-exempted condition. The adoption-exempted condition is a condition that the adoption of this evaluation item is exempted when this evaluation item is adopted to another apparatus in the control system. The adoption-exempted condition is, for example, a condition that the subject apparatus is exempted from the adoption of this evaluation item when this evaluation item is adopted to the outside communication apparatus. Further, the adoption-exempted condition also includes a condition that the subject apparatus is exempted from the adoption of this evaluation item when this evaluation item is adopted to another apparatus which is closer to the outside communication apparatus. In addition, the evaluation item in which the adoption-exempted condition is described in the option condition is referred to as an exemption evaluation item. Besides, another apparatus which is closer to the outside communication apparatus is decided by, for example, the number of hops to the outside communication apparatus. In the configuration tree of FIG. 5, the apparatus D and the apparatus E are closer to the apparatus A, which is the outside communication apparatus, than the apparatus F.

The evaluation method indicates an evaluation method by the active scan unit 109.

The scan-necessary flag indicates whether the active scan is necessary or not.

The scan subject indicates the subject of the active scan.

The check item indicates descriptions to be checked in the apparatus information 102 or the result of the active scan.

The evaluation standard value indicates a standard value to be compared with the apparatus information 102 or with the result of the active scan.

The corresponding-threat example indicates an example of a threat assumed when the apparatus information 102 or the result of the active scan does not satisfy the evaluation standard value.

The measure example indicates an example of a measure to be taken when the apparatus information 102 or the result of the active scan does not satisfy the evaluation standard value.

The candidate security evaluation item 106 is written in a language capable of performing a security inspection, such as an XML (Extensible Markup Language) basis OVAL (Open Vulnerability and Assessment Language), for example. In the candidate security evaluation item 106, a saving place of a value extracted from the apparatus by the active scan, and the like may be written in an XML format, in addition to the items described in FIG. 8.

The evaluation item generation unit 107 acquires the candidate security evaluation item 106 exemplified in FIG. 8 for each of the apparatuses included in the control system.

Next, in step S3002, the evaluation item generation unit 107 acquires the security policy checklist 901.

The security policy checklist 901 indicates the selection standard for selecting the selected security evaluation item 108 from the plurality of candidate security evaluation items 106. The security policy checklist 901 can be manually generated by the user of the inspection device 100, or can be automatically generated by the user selecting a category which conforms to an international standard.

FIG. 9 illustrates an example of the security policy checklist 901.

The security policy checklist 901 is written in a written format capable of expressing a checklist of a security setting, such as an XCCDF (eXtensible Configuration Checklist Description Format), for example. Further, the security policy checklist 901 is written by structuring, for example, in the XML format. By doing this, the check item, such as an expiration period of a password, and an update history of the password and the like can be listed together with information of an identification number such as CCE (Common Configuration Enumeration), and generated as the check item.

In the security policy checklist 901, the number of the security policy and the number of the evaluation item to be extracted are listed. In the security policy checklist 901, the evaluation item number of the security evaluation item to be extracted to realize the security policy is indicated for each security policy.

In the example of FIG. 9, in order to realize security policy of a policy number "1", the candidate security evaluation item 106 whose evaluation item number is "1" and the candidate security evaluation item 106 whose evaluation item number is "2" are necessary to be extracted. In order to realize security policy of a policy number "2", the candidate security evaluation item 106 whose evaluation item number is "2", the candidate security evaluation item 106 whose evaluation item number is "3", and the candidate security evaluation item 106 whose evaluation item number is "4" are necessary to be extracted.

Next, in step S3003, the evaluation item generation unit 107 extracts the security evaluation item of the evaluation item number which corresponds to the "evaluation item number" of the security policy checklist 901.

Besides, even if a same evaluation item number is described redundantly in the security policy checklist 901, the evaluation item generation unit 107 performs the extraction of the corresponding security evaluation item only once.

Although in the example of FIG. 9, the security evaluation item whose evaluation item number is "2" is described redundantly, the evaluation item generation unit 107 performs, only once, the extraction of the security evaluation item whose evaluation item number is "2".

Next, in step S3004, the evaluation item generation unit 107 determines for each of the apparatuses, whether or not the communication path to the outside communication apparatus is described in corresponding system information 104.

When the communication path to the outside communication apparatus is not described in the system information 104 of the apparatus currently subject to the determination (NO in step S3004), the evaluation item generation unit 107 deletes the security evaluation item related to the outside access in step S3005. Besides, the evaluation item generation unit 107 decides whether or not to delete the security evaluation item in step S3005, by referring to the essential flag and the option condition of the security evaluation item.

For example, it is assumed that the communication path to the outside communication apparatus is not described in the system information 104 of an apparatus x (NO in step S3004). Further, it is assumed that the outside access condition is described in the option condition of the security evaluation item extracted for the apparatus x in step S3003. In this case, the evaluation item generation unit 107 deletes the security evaluation item in step S3005. As described above, the evaluation item generation unit 107 does not select the security evaluation item related to the communication with the outside of the information system, for the apparatus that does not have the communication path with the outside communication apparatus.

On the other hand, when the essential flag of the security evaluation item extracted for the apparatus x in step S3003 is on, the evaluation item generation unit 107 does not delete the security evaluation item. Further, if the outside access condition is not described in the option condition of the security evaluation item extracted for the apparatus x in step S3003, the evaluation item generation unit 107 does not delete the security evaluation item.

In a case of NO in step S3004, the evaluation item generation unit 107 determines in step S3006, whether or not there is the exemption evaluation item for the apparatus currently subject to the determination.

That is, the evaluation item generation unit 107 determines for the apparatus currently subject to the determination, whether or not the adoption-exempted condition is described in the option condition of the security evaluation item extracted in step S3003.

If there is the exemption evaluation item for the apparatus currently subject to the determination (YES in step S3006), the evaluation item generation unit 107 determines in step S3007, whether or not the exemption evaluation item is adopted to the outside communication apparatus. Further, the evaluation item generation unit 107 determines whether or not the exemption evaluation item is adopted to another apparatus closer to the outside communication apparatus than the apparatus currently subject to the determination. Then, when the exemption evaluation item is adopted to the outside communication apparatus or another apparatus which is closer to the outside communication apparatus, the evaluation item generation unit 107 deletes the exemption evaluation item for the apparatus currently subject to the determination. As described above, the evaluation item generation unit 107 does not select for the apparatus for which there exists the security evaluation item the adoption of which is to be exempted due to the adoption of which to another apparatus in the control system, the security evaluation item the adoption of which is to be exempted.

If the exemption evaluation item is not adopted to the outside communication apparatus or another apparatus which is closer to the outside communication apparatus, a process of step S3008 is performed.

When a plurality of security evaluation items are extracted for the apparatus currently subject to the determination, the evaluation item generation unit 107 performs the processes from steps S3004 to S3007 for each security evaluation item.

In step S3008, the evaluation item generation unit 107 finally selects the security evaluation item that has not been deleted in steps S3005 and S3007, from the security evaluation items extracted in step S3003 for the apparatus currently subject to the determination.

Next, in step S3009, the evaluation item generation unit 107 determines whether or not the selection of the security evaluation item has been completed for all the apparatuses configuring the control system.

When the selection of the security evaluation item is completed for all the apparatuses (YES in step S3009), the process ends. On the other hand, when there is an apparatus for which the selection of the security evaluation item has not been completed (NO in step S3009), the evaluation item generation unit 107 repeats the processes from step S3003 to step S3009 until the selection of the security evaluation item is completed for all the apparatuses.

Figure 10:
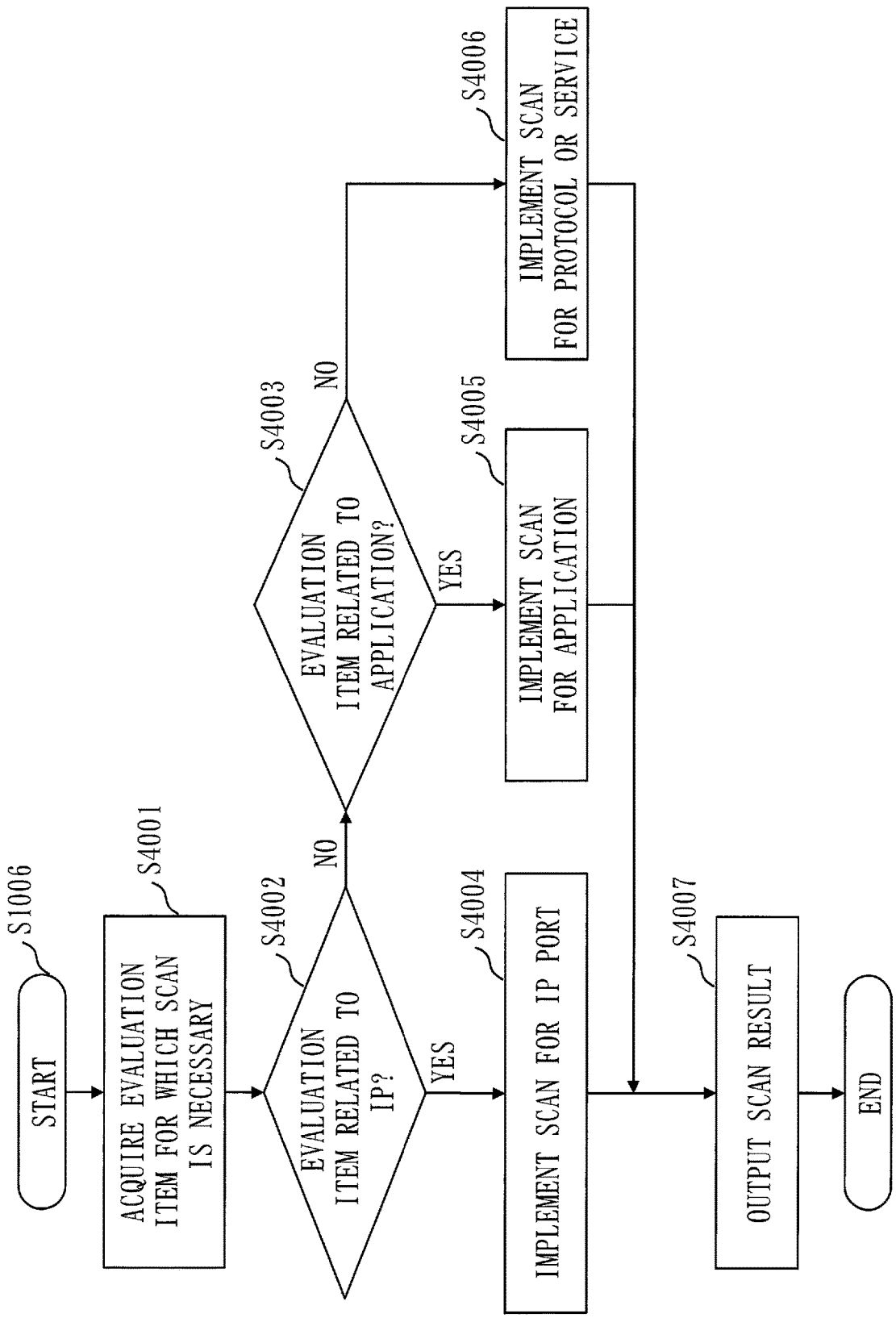
FIG. 10 is a flowchart illustrating an operation example of the inspection device according to the first embodiment.

Next, the details of the execution process of the active scan in step S1006 of FIG. 3 will be described with reference to FIG. 10.

In step S4001, the active scan unit 109 acquires an evaluation item for which the scan is necessary.

More specifically, the active scan unit 109 acquires the security evaluation item for which the scan-necessary flag is on, among the selected security evaluation items 108.

Next, in step S4002, the active scan unit 109 determines a scan method to be implemented, by referring to the scan subject of the security evaluation item acquired in step S4001.

Specifically, in step S4002, the active scan unit 109 determines whether or not the scan subject is related to an IP communication. That is, the active scan unit 109 checks whether or not the IP communication is described in the scan subject of the security evaluation item. If the IP communication is described in the scan subject (YES in step S4002), the process proceeds to step S4004. On the other hand, when the IP communication is not described in the scan subject (NO in step S4002), the process proceeds to S4003.

In step S4003, the active scan unit 109 determines whether or not the scan method to be implemented is related to an application.

Specifically, the active scan unit 109 checks whether or not the application is described in the scan subject of the security evaluation item. If the application is described in the scan subject (YES in step S4003), the process proceeds to step S4005. On the other hand, if the application is not described in the scan subject (NO in step S4003), that is, if the scan subject is a control protocol or a unique service, the process proceeds to S4006.

In step S4004, the active scan unit 109 implements the scan utilizing the IP communication.

In step S4004, the active scan unit 109 transmits a scan packet using the IP address as a destination, which is indicated in the system information 104. As a scan related to the IP communication, there is a port scan. In addition, the active scan unit 109 refers to the evaluation method of the security evaluation item and implements a scan suitable for the evaluation method.

In step S4005, the active scan unit 109 implements the scan for the application.

In step S4005, the active scan unit 109 transmits a scan packet using an IP address or an address corresponding to the application as a destination, the IP address being indicated in the system information 104, the application being indicated in the system information 104. There is an access to an FTP (File Transfer Protocol) as the scan related to the application, and in this case, the active scan unit 109 utilizes the IP address. Further, also in step S4005, the active scan unit 109 refers to the evaluation method of the security evaluation item, and implements the scan suitable for the evaluation method.

In step S4006, the active scan unit 109 implements the scan for the control protocol or the service.

In step S4006, the active scan unit 109 transmits the scan packet using an address of another protocol indicated in the system information 104, as a destination. Further, also in step S4006, the active scan unit 109 refers to the evaluation method of the security evaluation item and implements the scan suitable for the evaluation method.

Finally, in step S4007, the active scan unit 109 outputs the results of the scans implemented in step S4004, step S4005, and step S4006 to the security evaluation unit 111.

Next, the details of the security evaluation process in step S1007 illustrated in FIG. 3 will be described with reference to FIG. 11.

In step S5001, the security evaluation unit 111 acquires the apparatus information 102, the selected security evaluation item 108, and the active scan result 110.

Next, in step S5002, the security evaluation unit 111 extracts the check item of the selected security evaluation item 108 and checks which value is subject to the evaluation.

Next, in step S5003, the security evaluation unit 111 extracts a corresponding value from the apparatus information 102 or the active scan result 110, as the value of the check item extracted in step S5002.

Next, in step S5004, the security evaluation unit 111 extracts the evaluation standard value from the selected security evaluation item 108.

Next, in step S5005, the security evaluation unit 111 determines whether or not the value extracted in step S5003 satisfies the evaluation standard value extracted in step S5004.

When the value extracted in step S5003 satisfies the evaluation standard value (YES in step S5005), a security measure has been taken in the apparatus. In this case, the process proceeds to step S5006.

On the other hand, when the value extracted in step S5003 does not satisfy the evaluation standard value (NO in step S5005), the security measure has not been taken in the apparatus, or the security measure has not been taken properly in the apparatus. In this case, the process proceeds to step S5007.

In step S5006, since the security measure has been taken in the apparatus, the security evaluation unit 111 generates the security evaluation result 112 that there is no problem, and ends the process.

In step S5007, since the security measure has not been taken in the apparatus or the security measure has not been taken properly in the apparatus, the security evaluation unit 111 generates the security evaluation result 112 that there is a problem.

Further, in step S5008, the security evaluation unit 111 extracts from the "corresponding-threat example" and the "measure example" of the selected security evaluation item 108, the threat example and the measure example which are assumed in a case where the security measure has not been taken or the security measure has not been taken properly. Then, the security evaluation unit 111 adds to the security evaluation result 112, the threat example and the measure example which are extracted, and ends the process.

*Description of Effect of Embodiment*

As described above, in the present embodiment, the security evaluation item is selected for each of the apparatuses in consideration of at least one of the possibility of communicating with the outside of the information system and the possibility in which there is the security evaluation item the adoption of which is to be exempted due to the adoption of which to another apparatus in the information system. Therefore, according to the present embodiment, it is possible to select an appropriate security evaluation item according to the characteristics of the apparatus.

That is, since the inspection device according to the present embodiment generates the security evaluation item necessary for the information system based on the configuration of the information system, it is possible to implement the security evaluation appropriately on an entire information system.

Further, since the inspection device according to the present embodiment are fully automatically executed, it is possible to eliminate an omission and an error due to human involvement. Further, it is possible to make a security evaluation more efficient by executing fully automatically.

Further, the inspection device according to the present embodiment implements the extraction of the security evaluation item according to the security policy selected by the user. Therefore, it is possible to extract the appropriate security evaluation item simply by changing the selection of the security policy based on a rule unique to the system or a rule of the international standard.

Further, even if there is a change on the security policy necessary for the information system, it is possible to extract the security evaluation item which conforms to a new security policy without performing a setting change and the like.

Further, the inspection device according to the present embodiment checks a state of the apparatus by the active scan. For this reason, it is possible to check the state of the apparatus without performing the setting change on the apparatus or an addition of a program. Therefore, it is possible to implement the security evaluation of the information system simply by connecting the inspection apparatus to an existing information system.

Further, the inspection device according to the present embodiment outputs the security evaluation result to the apparatus capable of accessing the inspection device. For this reason, the user can check the security evaluation result from anywhere such as an office.

Second Embodiment

*Description of Configuration*

Figure 12:
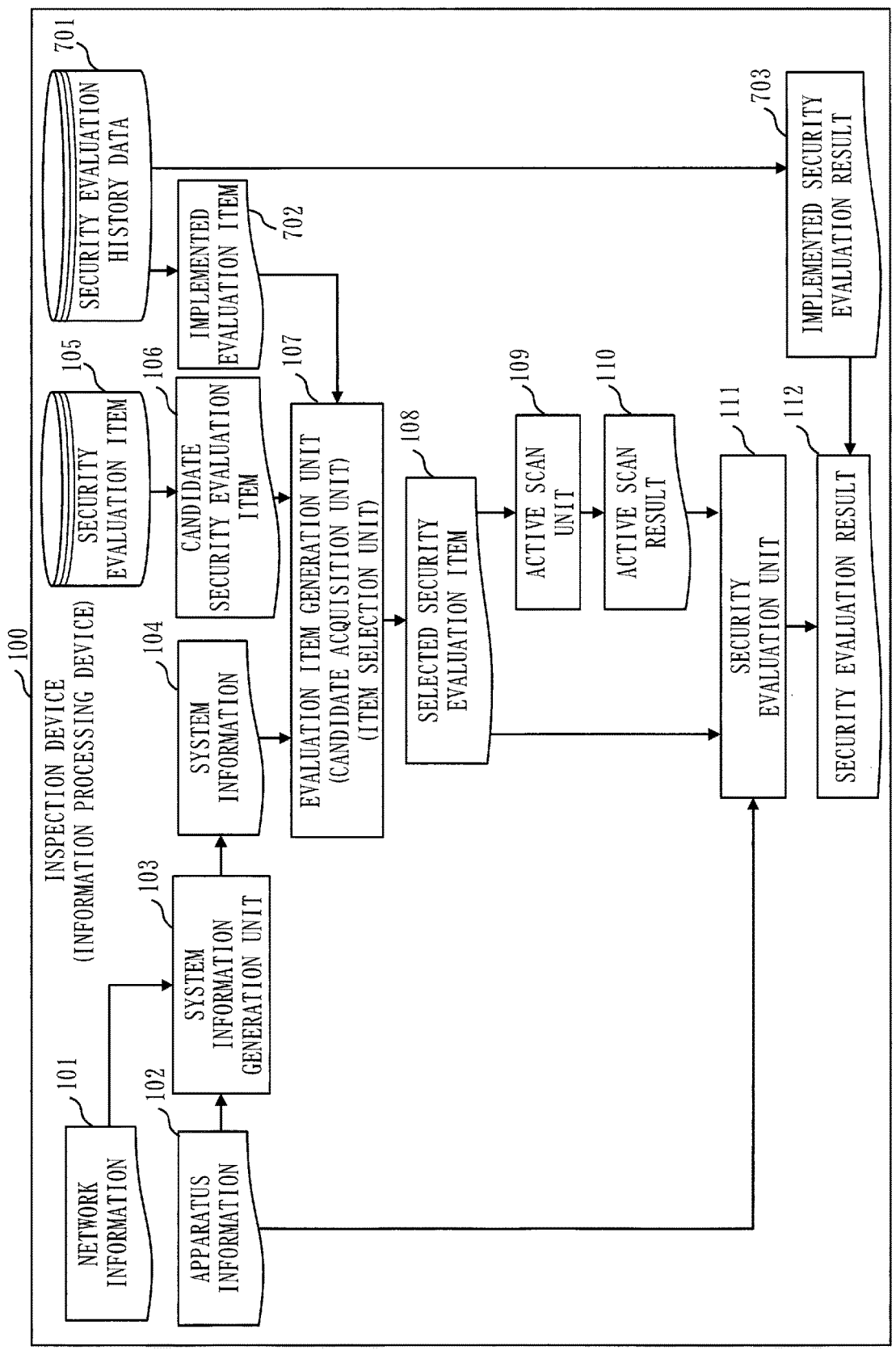
FIG. 12 is a diagram illustrating a functional configuration example of an inspection device according to a second embodiment.

FIG. 12 is a functional configuration example of the inspection device 100 according to a second embodiment.

The same reference numerals are used to the same elements as those in FIG. 1. Besides, although an illustration of the security policy checklist 901 is omitted for a reason of drawing, the evaluation item generation unit 107 acquires the security policy checklist 901 as with the first embodiment.

In FIG. 12, security evaluation history data 701, an implemented evaluation item 702, and an implemented security evaluation result 703 are added as compared with FIG. 1.

Besides, a hardware configuration of the inspection device 100 is as illustrated in FIG. 2.

Further, matters not described below are the same as those in the first embodiment.

The security evaluation history data 701 is configured by a configuration tree generated in the past, the selected security evaluation item 108, and the security evaluation result 112. That is, the configuration tree generated in the past, the selected security evaluation item 108, and the security evaluation result 112 are accumulated in a database as the security evaluation history data 701. The security evaluation history data 701 is accumulated, for example, in a database outside of the inspection device 100.

The implemented evaluation item 702 is a past selected security evaluation item 108 extracted from the security evaluation history data 701.

The implemented security evaluation result 703 is a past security evaluation result 112 extracted from the security evaluation history data 701.

Besides, in the present embodiment, when a change occurs on the apparatus included in the control system, the system information generation unit 103 changes the system information 104 in accordance with the change occurred.

In addition, when a change occurs on the apparatus included in the control system, the evaluation item generation unit 107 changes the security evaluation item to be selected, in accordance with the change occurred.

Similarly, when a change occurs on the apparatus included in the control system, the active scan unit 109 implements a new active scan in accordance with the change occurred.

In addition, when a change occurs on the apparatus included in the control system, the security evaluation unit 111 performs a new security evaluation in accordance with the change occurred.

*Description of Operation*

Next, an operation example of the inspection device 100 according to the present embodiment will be described with reference to FIGS. 13 and 14.

Figure 13:
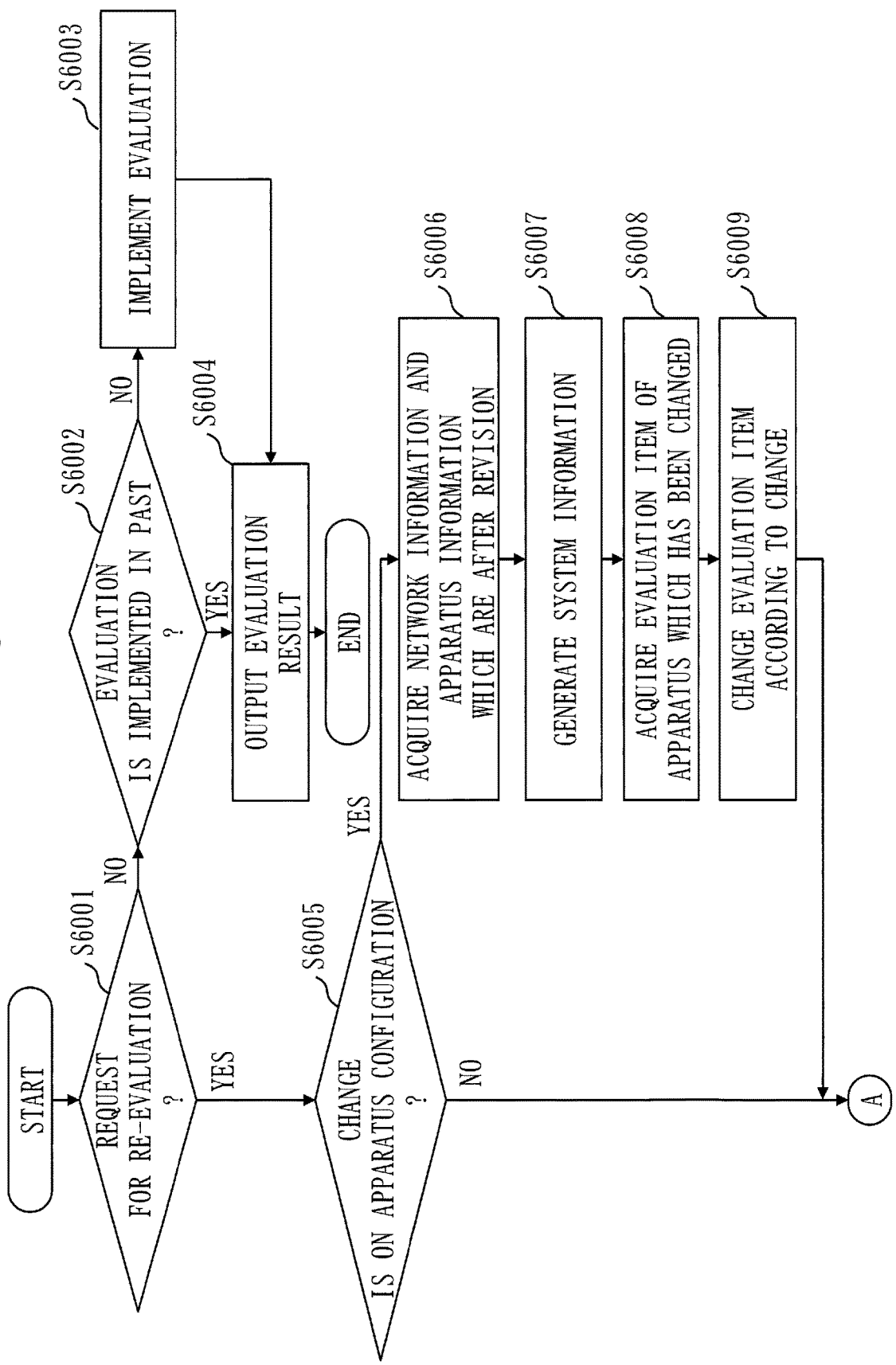
FIG. 13 is a flowchart illustrating an operation example of the inspection device according to the second embodiment.
Figure 14:
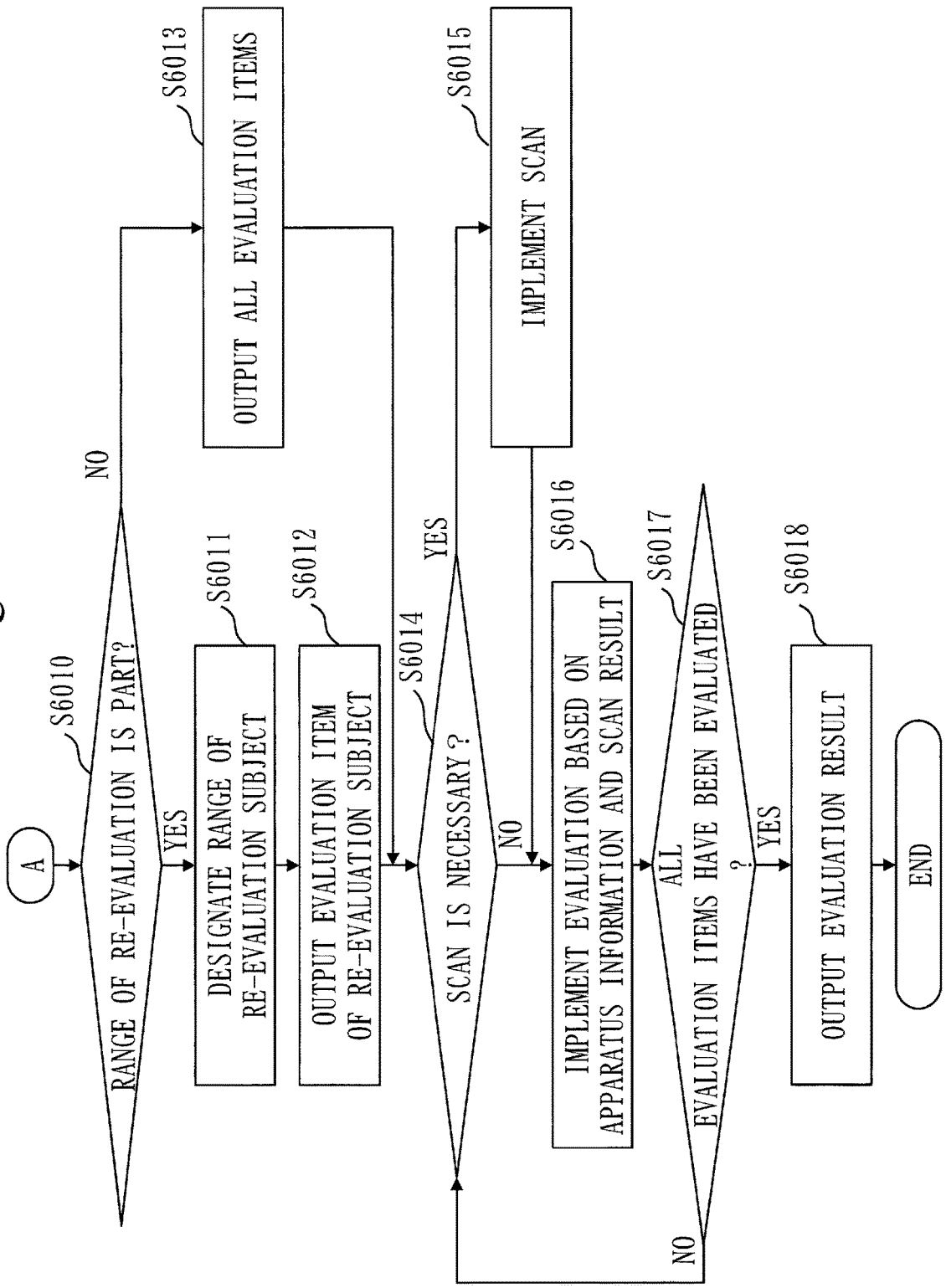
FIG. 14 is a flowchart illustrating an operation example of the inspection device according to the second embodiment.

FIGS. 13 and 14 illustrate examples of the operation of a re-evaluation in the inspection device 100, and the operation flow of the inspection device 100 does not necessarily have to be as in FIGS. 13 and 14.

When there is a request for the security evaluation from the user of the inspection device 100, the system information generation unit 103 determines in step S6001, whether or not the request from the user is a request for the re-evaluation. The request for the re-evaluation is, when there is a change on an apparatus configuration of the control system or a change on a setting of the apparatus, to request the security evaluation based on details after the change. If the request from the user indicates the change on the control system, the system information generation unit 103 determines that the request is the request for the re-evaluation. The change on the control system includes the change on the apparatus configuration (an addition of an apparatus, a deletion of an apparatus, a change of a connection relationship between apparatuses, and a replacement of an apparatus) and the change on the setting of the apparatus (an addition of a setting, a deletion of a setting, and a change on a set value).

If the request from the user is the request for the re-evaluation (YES in step S6001), the process proceeds to step S6005. On the other hand, if the request from the user is not the request for the re-evaluation (NO in step S6001), the process proceeds to step S6002.

In step S6002, the system information generation unit 103 determines whether or not the security evaluation has been implemented in the past.

More specifically, the system information generation unit 103 refers to the security evaluation history data 701. Then, if there is the past security evaluation result 112 in the security evaluation history data 701, the system information generation unit 103 determines that the security evaluation has been implemented in the past. On the other hand, if there is not the past security evaluation result 112 in the security evaluation history data 701, the system information generation unit 103 determines that the security evaluation has not been implemented in the past.

If the security evaluation has been implemented in the past (YES in step S6002), the process proceeds to step S6004. On the other hand, if the security evaluation has not been implemented in the past (NO in step S6002), the process proceeds to step S6003.

In step S6003, the security evaluation of the control system is performed. In this case, it is a new evaluation for the control system.

In step S6003, the generation of the system information 104, the generation of the selected security evaluation item 108, the active scan, and the security evaluation are performed according to the procedures described in the first embodiment, and finally the security evaluation result 112 is generated.

In step S6004, the system information generation unit 103 extracts as the implemented security evaluation result 703, the past security evaluation result 112 from the security evaluation history data 701, and outputs the implemented security evaluation result 703 which has been extracted.

As an output destination of the implemented security evaluation result 703, for example, a display connected to the inspection device 100, a terminal device used by the user of the inspection device 100, an outside database, or the like is considered.

In step S6005, the system information generation unit 103 determines whether or not there is a change on the apparatus configuration.

For example, if details of the change on the apparatus configuration is described in the request from the user in step S6001, the system information generation unit 103 determines that there is the change on the apparatus configuration. Further, the system information generation unit 103 may determine whether or not the network information 101 and the apparatus information 102 have been revised since a time when the system information 104 has been generated last time. In this case, if the network information 101 and the apparatus information 102 have been revised, the system information generation unit 103 determines that there is the change on the apparatus configuration.

If there is the change on the apparatus configuration (YES in step S6005), the process proceeds to step S6006. On the other hand, if there is no change on the apparatus configuration, that is, if there is a change on the setting of the apparatus (NO in step S6005), the process proceeds to step S6010.

In step S6006, the system information generation unit 103 acquires the network information 101 and the apparatus information 102 which are after a revision.

Next, in step S6007, the system information generation unit 103 generates the system information 104 corresponding to a current apparatus configuration.

Specifically, the system information generation unit 103 extracts from the security evaluation history data 701, the configuration tree (FIG. 5) generated when the system information 104 has been generated last time. Further, the system information generation unit 103 performs an addition or a deletion of the network, an addition or a deletion of the apparatus, or a change on the connection relationship between apparatuses to the extracted configuration tree according to the network information 101 and the apparatus information 102 which are after the revision. Then, the system information generation unit 103 generates new system information 104 based on a new configuration tree. A procedure for generating the new system information 104 based on the new configuration tree is the same as that described in the first embodiment.

Then, the system information generation unit 103 outputs the new system information 104 to the evaluation item generation unit 107.

Next, in step S6008, the evaluation item generation unit 107 acquires the security evaluation item of the apparatus which has been changed, from the security evaluation items 105 based on the new system information 104.

If there is the change on the apparatus that configures the control system, it is also necessary to change the security evaluation item. Therefore, the evaluation item generation unit 107 acquires the security evaluation item of the apparatus which has been changed.

Next, in step S6009, the evaluation item generation unit 107 changes the security evaluation item according to the change on the apparatus configuration of the control system.

Specifically, the evaluation item generation unit 107 extracts from the security evaluation history data 701, the security evaluation item which is before the change and has been generated last time. Then, the evaluation item generation unit 107 deletes the security evaluation item which is before the change and has been extracted from the security evaluation history data 701, and adds the security evaluation item which is after the change and has been acquired in step S6008. Further, in step S6009, the flow in FIG. 7 is carried out. That is, if there is the outside access condition in the security evaluation item which is after the change, the system information generation unit 103 deletes the security evaluation item. Similarly, if the security evaluation item which is after the change is the exemption evaluation item, and if the security evaluation item is adopted to another apparatus, the system information generation unit 103 deletes the security evaluation item.

In step S6010, the evaluation item generation unit 107 checks a range of a re-evaluation subject.

That is, the evaluation item generation unit 107 checks whether or not the range of the re-evaluation subject is limited to a part of the security evaluation items. For example, when the user designates the part of the security evaluation items as the range of the re-evaluation subject, the evaluation item generation unit 107 determines that the range of the re-evaluation subject is limited to the part of the security evaluation items. Further, if a scale of the change (the change on the apparatus configuration or the change on the setting of the apparatus) is small, and it is sufficient that the security evaluation is performed using only the security evaluation item related to the change, the evaluation item generation unit 107 determines that the range of the re-evaluation subject is limited to the part of the security evaluation items.

When the range of the re-evaluation subject is limited to the part of the security evaluation items (YES in step S6010), the process proceeds to step S6011. On the other hand, when the range of the re-evaluation subject is all the security evaluation items (NO in step S6010), the process proceeds to step S6011.

In step S6011, the evaluation item generation unit 107 designates the range of the re-evaluation subject.

That is, the active scan unit 109 designates the part of the security evaluation items subject to the re-evaluation.

When step S6009 is carried out, the evaluation item generation unit 107 designates the part of security evaluation items among the security evaluation items obtained by carrying out step S6009.

On the other hand, when step S6009 is not carried out (a case of the setting change on the apparatus), the evaluation item generation unit 107 acquires last selected security evaluation items 108 from the security evaluation history data 701, and designates the part of the security evaluation items among the acquired selected security evaluation items 108.

Next, in step S6012, the evaluation item generation unit 107 outputs the security evaluation item designated in step S6011 as a new selected security evaluation item 108 to the active scan unit 109 and the security evaluation unit 111.

In step S6013, the evaluation item generation unit 107 outputs all the security evaluation items to the active scan unit 109.

When step S6009 is carried out, the evaluation item generation unit 107 outputs the security evaluation item obtained by carrying out step S6009 as the new selected security evaluation item 108 to the active scan unit 109.

On the other hand, when step S6009 is not carried out (the case of the setting change on the apparatus), the evaluation item generation unit 107 acquires the last selected security evaluation item 108 from the security evaluation history data 701, and outputs the selected security evaluation item 108 acquired last time to the active scan unit 109 and the security evaluation unit 111.

In step S6014, the active scan unit 109 checks the scan-necessary flag described in the selected security evaluation item 108 acquired from the evaluation item generation unit 107, and determines whether the scan is necessary or not.

If the scan-necessary flag is off, the scan is unnecessary for the selected security evaluation item 108. In this case, the process proceeds to S6016. On the other hand, if the scan-necessary flag is on, the scan is necessary for the selected security evaluation item 108. In this case, the process proceeds to S6015.

In step S6015, the active scan unit 109 implements the scan for the security evaluation item determined necessary to be scanned in step S6014. The scan is performed according to a procedure illustrated in FIG. 10.

Further, the active scan unit 109 generates the active scan result 110 indicating the scan result, and outputs the generated active scan result 110 to the security evaluation unit 111.

In step S6016, the security evaluation unit 111 evaluates the security setting status of each of the apparatuses by using the apparatus information 102, the selected security evaluation item 108, and the active scan result 110.

Figure 11:
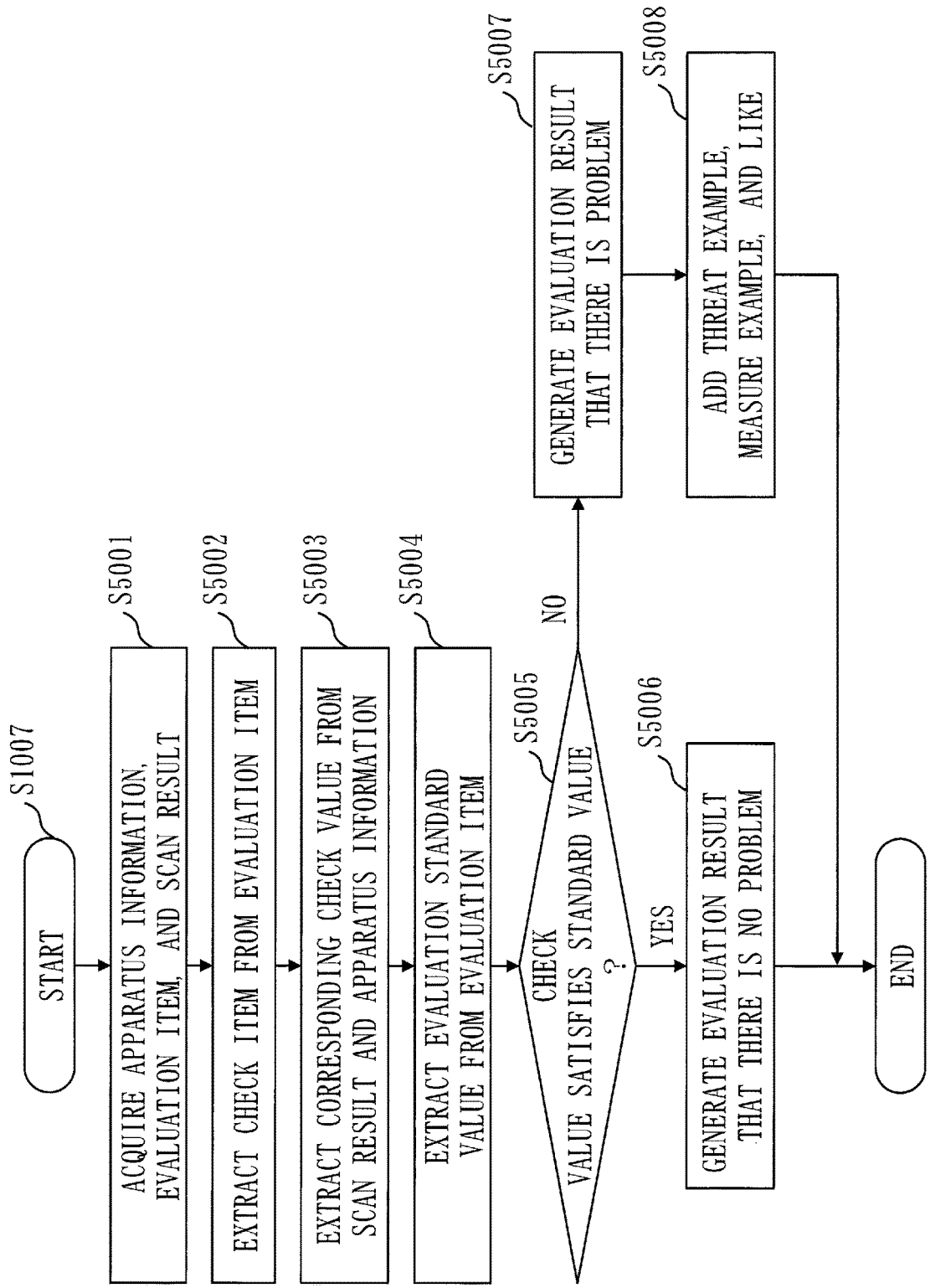
FIG. 11 is a flowchart illustrating an operation example of the inspection device according to the first embodiment.

In step S6016, operation in FIG. 11 is performed.

When the evaluation is completed for all the security evaluation items of the selected security evaluation items 108 (YES in step S6017), the security evaluation unit 111 outputs the security evaluation result 112 in step S6018.

The security evaluation unit 111 may output the security evaluation result 112 to, for example, the display device connected to the inspection device 100. Further, the security evaluation unit 111 may transmit the security evaluation result 112 to the outside apparatus by using the communication device 202.

On the other hand, if there is a security evaluation item for which the evaluation has not been completed (NO in step S6018), the process returns to step S6014. The processes from steps S6014 to S6017 are repeated until the evaluation for all the security evaluation items is completed.

\*\*\*Description of Effect of Embodiment\*\*\*

As described above, when the change occurs on the information system, the inspection device according to the present embodiment can efficiently performs the security evaluation appropriately by implementing the necessary security evaluation according to the changed location.

In addition, the inspection device according to the present embodiment can perform the re-evaluation in a short period of time with a small amount of resources since the inspection device effectively utilize the security evaluation item generated in the past and the evaluation result generated in the past when performing the re-evaluation.

Although the embodiments of the present invention have been described above, these two embodiments may be combined and implemented.

Alternatively, one of these two embodiments may be partially implemented.

Alternatively, these two embodiments may be partially combined and implemented.

Besides, the present invention is not limited to these embodiments, and various types of modifications can be made as necessary.

\*\*\*Description of Hardware Configuration\*\*\*

Finally, a supplementary explanation of the hardware configuration of the inspection device 100 will be given.

The processor 201 illustrated in FIG. 2 is an IC (Integrated Circuit) that performs processing.

The processor 201 is a CPU (Central Processing Unit), a DSP (Digital Signal Processor), or the like.

The storage device 203 illustrated in FIG. 2 is an RAM (Random Access Memory), an ROM (Read Only Memory), a flash memory, an HDD (Hard Disk Drive), or the like.

The communication device 202 illustrated in FIG. 2 is an electronic circuit that executes a communication process of data.

The communication device 202 is, for example, a communication chip or an NIC (Network Interface Card).

In addition, an OS (Operating System) is also stored in the storage device 203.

Further, at least a part of the OS is executed by the processor 201.

The processor 201 executes programs that realize functions of the system information generation unit 103, the evaluation item generation unit 107, the active scan unit 109, and the security evaluation unit 111 while executing at least the part of the OS.

By the processor 201 executing the OS, task management, memory management, file management, communication control, and the like are performed.

Further, at least one of information, data, a signal value, and a variable value indicating a processing result of the system information generation unit 103, the evaluation item generation unit 107, the active scan unit 109, and the security evaluation unit 111 is stored in at least one of the storage device 203, and a register and a cache memory in the processor 201.

Further, the programs that realize the functions of the system information generation unit 103, the evaluation item generation unit 107, the active scan unit 109, and the security evaluation unit 111 may be stored in a portable recording medium such as a magnetic disk, a flexible disk, an optical disk, a compact disk, a Blu-ray (registered trademark) disk, or a DVD.

Further, "unit" of the system information generation unit 103, the evaluation item generation unit 107, the active scan unit 109, and the security evaluation unit 111 may be read as "circuit" or "step" or "procedure" or "process".

Further, the inspection device 100 may be realized by a processing circuit. The processing circuit is, for example, a logic IC (Integrated Circuit), a GA (Gate Array), an ASIC (Application Specific Integrated Circuit), or an FPGA (Field-Programmable Gate Array).

Besides, in the present specification, a superordinate concept of the processor and the processing circuit is referred to as "processing circuitry".

That is, each of the processor and the processing circuit is a specific example of the "processing circuitry".

REFERENCE SIGNS LIST

100: inspection device, 101: network information, 102: apparatus information, 103: system information generation unit, 104: system information, 105: security evaluation items, 106: candidate security evaluation item, 107: evaluation item generation unit, 108: selected security evaluation item, 109: active scan unit, 110: active scan result, 111: security evaluation unit, 112: security evaluation result, 201: processor, 202: communication device, 203: storage device, 701: security evaluation history data, 702: implemented evaluation item, 703: implemented security evaluation result, 901: security policy checklist.

The invention claimed is:

1. An information processing device comprising:
processing circuitry
to acquire a plurality of candidates for security evaluation items to be adopted to a plurality of apparatuses included in an information system; and
to analyze at least one of: whether or not an outside communication apparatus that performs communication with the outside of the information system is included in the plurality of apparatuses, and whether or not each apparatus of the plurality of apparatuses has a communication path with the outside communication apparatus; and
whether or not there exists in each apparatus of the plurality of apparatuses, an exemption of an adoption of a security evaluation item due to an adoption of the security evaluation item to another apparatus in the information system, and select for each apparatus of the plurality of apparatuses, a security evaluation item to be adopted, from the plurality of candidates for the security evaluation items based on an analysis result,
wherein the processing circuitry does not select:
for at least one of an apparatus having the exemption of the adoption of the security evaluation item due to the adoption of the security evaluation item to an outside communication apparatus, the security evaluation item associated with the exemption, and
for an apparatus having the exemption of the adoption of the security evaluation item due to the adoption of the security evaluation item to an apparatus with smaller number of hops to the outside communication apparatus, the security evaluation item associated with the exemption.

2. The information processing device according to claim 1,
wherein the processing circuitry does not select a security evaluation item related to the communication with the outside of the information system, for an apparatus which does not have the communication path with the outside communication apparatus.

3. The information processing device according to claim 1,
wherein the processing circuitry acquires the plurality of candidates for the security evaluation items according to a designated security policy.

4. The information processing device according to claim 3,
wherein the processing circuitry acquires the plurality of candidates for the security evaluation items according to a security policy designated by a user of the information processing device.

5. The information processing device according to claim 1,
wherein the processing circuitry performs a security evaluation for each apparatus of the plurality of apparatuses by using a corresponding security evaluation item selected.

6. The information processing device according to claim 5,
wherein when a change occurs on an apparatus included in the information system, the processing circuitry performs a new security evaluation in accordance with the change occurred.

7. The information processing device according to claim 1,
wherein when a change occurs on an apparatus included in the information system, the processing circuitry changes a security evaluation item to be selected in accordance with the change occurred.

8. An information processing method comprising:

acquiring a plurality of candidates for security evaluation items to be adopted to a plurality of apparatuses included in an information system; and analyzing at least one of: whether or not an outside communication apparatus that performs communication with the outside of the information system is included in the plurality of apparatuses, and whether or not each apparatus of the plurality of apparatuses has a communication path with the outside communication apparatus; and whether or not there exists in each apparatus of the plurality of apparatuses, an exemption of an adoption of a security evaluation item due to an adoption of the security evaluation item to another apparatus in the information system, and selecting for each apparatus of the plurality of apparatuses, a security evaluation item to be adopted, from the plurality of candidates for the security evaluation items based on an analysis result, wherein the selecting for each apparatus of the plurality of apparatuses does not select:

for at least one of an apparatus having the exemption of the adoption of the security evaluation item due to the adoption of the security evaluation item to an outside communication apparatus, the security evaluation item associated with the exemption, and for an apparatus having the exemption of the adoption of the security evaluation item due to the adoption of the security evaluation item to an apparatus with smaller number of hops to the outside communication apparatus, the security evaluation item associated with the exemption.

9. A non-transitory computer readable medium storing an information processing program which causes a computer to execute:

a candidate acquisition process of acquiring a plurality of candidates for security evaluation items to be adopted to a plurality of apparatuses included in an information system; and an item selection process of analyzing at least one of: whether or not an outside communication apparatus that performs communication with the outside of the information system is included in the plurality of apparatuses, and whether or not each apparatus of the plurality of apparatuses has a communication path with the outside communication apparatus; and whether or not there exists in each apparatus of the plurality of apparatuses, an exemption of an adoption of a security evaluation item due to an adoption of the security evaluation item to another apparatus in the information system, and selecting for each apparatus of the plurality of apparatuses, a security evaluation item to be adopted, from the plurality of candidates for the security evaluation items based on an analysis result, wherein the selecting for each apparatus of the plurality of apparatuses does not select:

for at least one of an apparatus having the exemption of the adoption of the security evaluation item due to the adoption of the security evaluation item to an outside communication apparatus, the security evaluation item associated with the exemption, and for an apparatus having the exemption of the adoption of the security evaluation item due to the adoption of the security evaluation item to an apparatus with smaller number of hops to the outside communication apparatus, the security evaluation item associated with the exemption.

* * * * *